UNITED STATES PATENT OFFICE.

OLIVER P. MICHAEL, OF MARION, INDIANA, ASSIGNOR TO HIMSELF, JAMES H. BIRELEY, AND LEVI S. BIRELEY, OF SAME PLACE.

COMPOSITION OF MATTER FOR REPAIRING TIRES.

SPECIFICATION forming part of Letters Patent No. 643,518, dated February 13, 1900.

Application filed June 21, 1899. Serial No. 721,300. (No specimens.)

*To all whom it may concern:*

Be it known that I, OLIVER P. MICHAEL, of Marion, in the county of Grant and State of Indiana, have invented a new and useful Composition of Matter to be Used for Repairing Tires, of which the following is a full, clear, and exact specification.

The composition of matter consists of the following ingredients, combined substantially in the proportions stated, namely: pure bolted Spanish whiting, four and one-half ounces; Swedish black, one ounce; ground glue, one dram; oil of cinnamon, twenty drops; distilled rain-water, eight ounces.

Swedish black is a vegetable black used as a substitute for bone-black and is made from burned sea weed or grasses. Some manufacturers add a small quantity of burned bones.

In order to prepare this composition of matter, it is necessary to mix the Spanish whiting with the Swedish black in a mortar, and then the oil of cinnamon is added. The glue is dissolved in the water, and then this dissolved glue is mixed with the prepared Spanish whiting, Swedish black, and oil of cinnamon to form the composition of matter. Should the latter be too thick, it can be readily diluted with water.

In using the composition of matter it is preferably injected into the tire to be repaired through the air-valve thereof by the use of an ordinary bicycle-pump or other suitable means. The composition of matter within the tire readily closes the puncture or other leak, so that the tire is very quickly repaired without the aid of skilled labor.

The composition of matter can be readily used on single or double tube tires, is not liable to clog up the air-valve when introduced through the same, and also does not injure the material of which the tire is made nor cause a cementing of the inner tube to the casing if the composition is used on double tubing.

A short time after its injection into the tire the composition becomes of a jelly-like consistence, forming a coating on the inner surface of the tire, and finally it dries into a powdered form.

The composition of matter after being introduced into the tire by way of the air-valve and the use of a pump readily closes the puncture when run into it from the inside by turning the tire to a point with the puncture at the bottom. The tire can thus be repaired in a few minutes to be again ready for service.

I claim—

The herein-described composition of matter to be used for repairing bicycle-tires, consisting of Spanish whiting, Swedish black, glue and oil of cinnamon, combined in about the proportions stated.

OLIVER P. MICHAEL.

Witnesses:
ELMER WOODLING,
CHARLES S. HULLEY.